United States Patent

Sidler et al.

[11] Patent Number: 5,821,432
[45] Date of Patent: Oct. 13, 1998

[54] FORCE AND /OR MOMENT MEASURING DEVICE

[75] Inventors: Andreas Sidler, Wängi; Peter Wolfer, Kleinandelfingen; Josef Stirnimann, Winterthur; Denis Kohler, Neftenbach, all of Switzerland

[73] Assignee: K.K. Holding AG, Winterthur, Switzerland

[21] Appl. No.: 839,884

[22] Filed: Apr. 16, 1997

[30] Foreign Application Priority Data

May 9, 1996 [CH] Switzerland ............... 1192/96

[51] Int. Cl.$^6$ ...................................... G01L 1/16
[52] U.S. Cl. ................. 73/862.043; 73/862.041; 73/862.042
[58] Field of Search ........... 73/862.041, 862.042, 73/862.043, 862.06, 862.625, 862.49, 862.68, DIG. 4

[56] References Cited

U.S. PATENT DOCUMENTS

| | | | |
|---|---|---|---|
| 3,210,993 | 10/1965 | Shoor et al. ............... | 73/862.68 X |
| 3,640,130 | 2/1972 | Spescha et al. . | |
| 4,313,341 | 2/1982 | Yamaguchi et al. ............. | 73/862.68 X |
| 4,348,908 | 9/1982 | Shoh ............... | 73/862.68 X |
| 4,688,421 | 8/1987 | Pzsolla ............... | 73/862.043 X |
| 4,738,146 | 4/1988 | Baumgartner et al. ............. | 73/862.68 |
| 4,793,193 | 12/1988 | Borgudd . | |
| 4,821,584 | 4/1989 | Lembke ............... | 73/862.68 |
| 5,036,240 | 7/1991 | Lew ............... | 73/862.68 X |
| 5,165,205 | 11/1992 | Nakagawa et al. . | |
| 5,297,430 | 3/1994 | Sonderegger et al. ........... | 73/862.68 X |
| 5,329,823 | 7/1994 | Sonderegger et al. ........... | 73/862.68 X |
| 5,402,684 | 4/1995 | Engeler et al. . | |
| 5,513,536 | 5/1996 | Reger et al. . | |

FOREIGN PATENT DOCUMENTS

WO 85/03479  8/1985  WIPO .

OTHER PUBLICATIONS

Patent Abstracts of Japan–Publication No. 61111435 No date.
Patent Abstracts of Japan–Publication No. 63243828 No date.

*Primary Examiner*—Ronald L. Biegel
*Attorney, Agent, or Firm*—Barnes & Thornburg

[57] ABSTRACT

A force and moment measuring device has multicomponent force measuring cells arranged in opposite pairs at either side of a force introducing platform or mounting plate, viewed in the direction of their tension/pressure sensitivity. The opposed force measuring cells are preloaded by a common preloading screw extending in the direction of their tension/pressure sensitivity and passing through the force introduction platform without friction. The opposed force measuring cells have opposed tension/pressure sensitivity orientation. The tension/pressure measuring signals resulting from a temperature change occurring in the mounting plate and/or in the common preloading screw are cancelled out by opposed measuring cells, while the measured values generated by a force acting in one direction are added together.

11 Claims, 3 Drawing Sheets

$A_z : -Q_z \ (1/2F_T)$
$B_z : +Q_z \ (1/2F_T)$ $(A_z + B_z)_T = 0 \cdot Q_z \ (F_T)$ $A_z : +Q_z \ (1/2F)$
$B_z : +Q_z \ (1/2F)$ $(A_z + B_z) = 2Q_z \ (F)$

FORCE AND /OR MOMENT MEASURING DEVICE

BACKGROUND AND SUMMARY OF THE INVENTION

The invention relates to a force and/or moment measuring device having several multicomponent force measuring cells equipped with piezoelectric sensors, in conjunction with platforms for introducing force and/or moment and with amplifiers and evaluation units, each force measuring cell consisting of sensor disks sensitive to shear and tension/pressure.

In DE-C-1952522, a measuring device for measuring forces and torques is shown, having several multicomponent force measuring cells placed under preload between a base plate and a cover plate. The preload for the measuring cells, which contain sensor disks sensitive to both shear and tension/pressure, is imposed by a preloading screw passing through the measuring cell and screwed into the base plate from the cover plate. The orientation in the multicomponent measuring cells of the sensors, consisting typically of monocrystals such as quartz or of polycrystalline piezo ceramics, is such that the tension/pressure-sensitivity of the sensors is at right angles to the surface of the cover plate (z direction), which acts as mounting plate for the workpieces to be machined.

Now it has been shown that the temperature variations in the measuring device, due for example to heating resulting from machining the workpiece, will falsify the force measurements for the pressure force component because they cause different thermal expansion in the cover plate and preloading screws, and hence alter the preload.

In the fine and high-precision machining of workpieces especially, these measured value errors in the pressure force component due to temperature changes are not acceptable. It is therefore the purpose of the invention to provide a force measuring device that will compensate as far as possible the measuring errors caused by temperature changes. Of course the use of the new, temperature-compensated measuring device is not confined to measuring forces and moments in workpiece machining.

The purpose is accomplished by the invention by the force measuring cells being placed at the two end surfaces of the platform looking in the direction of the tension/pressure sensitivity of the sensors, also by the arrangement in pairs of tension/pressure-sensitive sensor disks interpenetrated and preloaded by a common preloading screw freely extensible in the platform, and finally the tension/pressure-sensitive sensor disks placed opposite each other at the ends of the platform and polarized at least approximately equal.

Owing to the opposed orientation of the sensor disks, a temperature change causing a length change over the force introduction plate located between the sensors. This length change on the mutually opposed sensors sets up charges of opposite sign in these disks, which therefore neutralize each other in the measuring signal. On the other hand a force component acting in one direction causes the charges of the two sensors to be added, giving the required force measuring signal.

In analogous fashion, measuring signals are generated by temperature changes if the measuring device is heated unilaterally. The heat is led into the interpenetrating preloading screw, again causing neutralization of the temperature-dependent measuring signals in the multicomponent force measuring cells.

For machining workpieces it has proved advantageous for the platform to be a rigid mounting plate taking the workpieces to be machined with the force measuring cells disposed at right angles to the mounting surface for the workpieces.

To obtain dynamo meters of minimal overall height, the platform can be placed between the measuring points and two outer assembling blocks, which in turn serve to install the measuring device, installation being accomplished with the help of two clamping screws placed close to the sensors. This provides a measuring device of high rigidity and hence high natural frequency. Furthermore by placing the common preloading screw in the neutral axis of the platform with regard to flexure, error signals due to platform flexures can be kept small or avoided.

For other applications of the new measuring device, such as in vehicle wheel hubs for example, a design has proved itself with the platform for force introduction taking the form of a disk plate, which is arranged in turn between two force derivation plates likewise of disk form interspaced with two opposed multicomponent force measuring cells.

Leading away the signals of several measuring cells is simplified if the signal leads for the measuring signals from the individual measuring cells are gathered in a collective conduit and led out via a collective plug connector, whence they are led to the amplifiers and evaluation units by cable link. However it is also possible to accommodate the amplifiers and evaluation units in the force introduction platform itself or in one of the mounting blocks, or else in one of the force derivation plates, so that onward transmission of the already amplified and processed signals is possible. This configuration enhances the reliability of the new measuring device in operation.

Other objects, advantages and novel features of the present invention will become apparent from the following detailed description of the invention when considered in conjunction with the accompanying drawings.

DETAILED DESCRIPTION OF THE PREFERRED EMBODIMENTS

Figure 1:
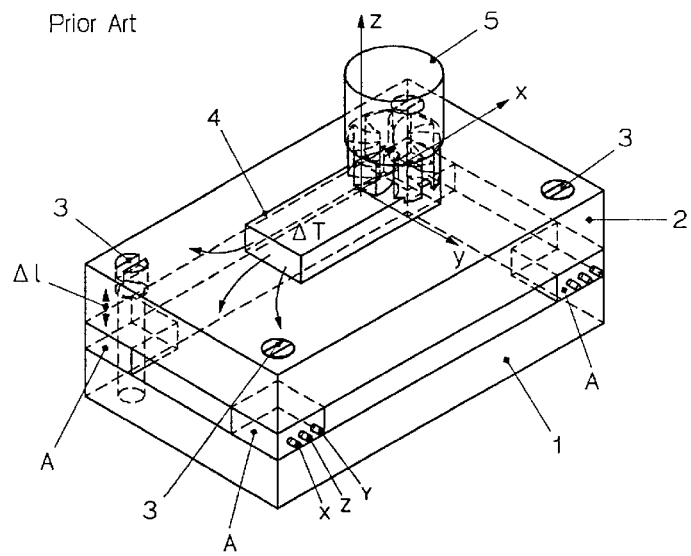
FIG. 1 shows a force measuring device of the prior art in perspective.

On the device embodying the prior art shown in FIG. 1, there are four multicomponent force measuring cells A under preload arranged between a base plate 1 and a cover plate 2. The preload is imposed by preloading screws 3, which pass through the cover plate 2 and measuring cells A and are screwed into the base plate 1. Mounted on the cover plate 2 is a workpiece 4, which is being machined by a tool 5 indicated only roughly.

Figure 2:
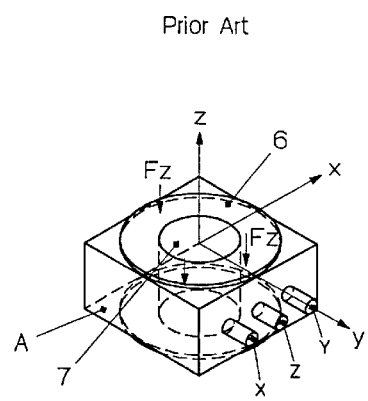
FIG. 2 shows a multicomponent force measuring cell of the prior art as used in FIG. 1 in perspective.

A single force measuring cell A as shown in FIG. 2 contains several piezoelectric sensor disks 6, of which at least one is sensitive to tension/pressure in the z direction of an orthogonal coordinate system and at least one each is sensitive to shear in the x and y directions. For the mentioned passage of the preloading screw 3, the measuring cell A has a hole 7. The signal lead connections of the measuring cell A for the signal components in the x, y and z directions are denoted x, y and z. Since the z direction of the cell reproducing the tension/pressure sensitivity of the measuring cell A is identical with the direction of the pressure force applied to the measuring device, the two coordinate systems for the measuring device and the measuring cell have the same orientation, as a comparison of FIGS. 1 and 2 reveals.

Due to the machining of the workpiece 4, the measuring device sustains on the one hand a temperature increase $\Delta T$ (FIG. 1) and on the other hand a force F, of which only the component Fz in the z direction is shown in FIG. 2. Owing to the temperature rise $\Delta T$ the preloading screw 3 is extended by $\Delta l$ (FIG. 1), causing a measuring error in the measurement of the force Fz in the z direction.

With the device according to the invention (FIGS. 3 and 4) the cover plate 2 is replaced by a T-shaped mounting platform 8, which is carried in a U-shaped support 9. The force measuring cells A and B are no longer arranged horizontal but constrained vertically between the uprights of the U support 9 and the stem of the T platform 8. According to the invention, the measuring cells A and B are preloaded by a single preloading screw 10 passing through the stem of the platform 8 and extending without friction through the platform 8. Moreover, the sensor disks 6 of the measuring cells A and B are arranged and oriented so that firstly the z direction of sensor disks 6 fixed by the direction of their tension/pressure sensitivity coincides with the direction of the preloading screw 10. Secondly the tension/pressure sensitivity for the measuring cell A is opposed to that of measuring cell B. As FIG. 5 shows, the coordinate system of the measuring cells is consequently turned 90° in relation to that of the measuring device.

A temperature increase in the stem of platform 8 located between the measuring cells A and B, and hence in the preloading screw 10 also, generates a force $F_T$ which is shared in equal halves between cells A and B. Related to the coordinate system for the measuring cells, with a given orientation of the tension/pressure-sensitive sensor disks in measuring cell A for example a charge $-Q_Z$ is generated as a function of the force ½ $F_T$, while in measuring cell B the charge $+Q_Z$ is generated owing to the opposed orientation of the tension/pressure-sensitive sensor disk, again as a function of ½ $F_T$. When the two temperature-dependent signal charges are brought together, the total charge $Q_Z$ $(F_T)=0$ results as the effect of the temperature force $F_T$ (FIG. 3), so that a compensation of the temperature influence results.

Figure 3:
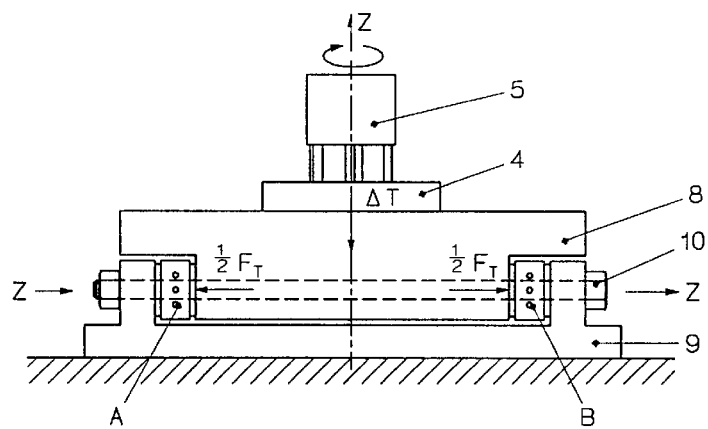
FIG. 3 shows schematically a force measuring device according to the invention under purely thermal loading.
Figure 4:
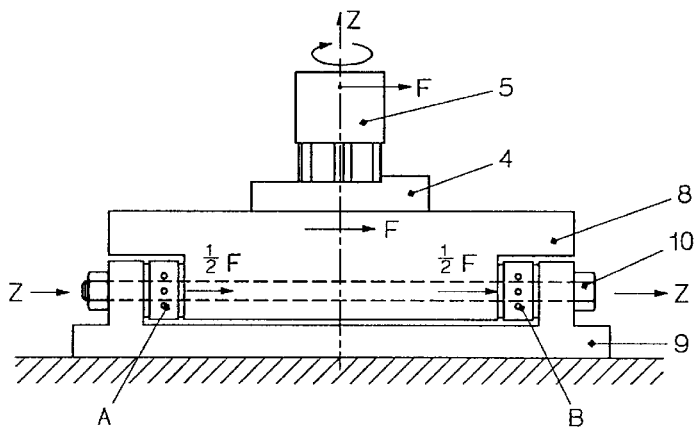
FIG. 4 shows schematically a force measuring device under load from an external force.

Under a unilaterally acting force F (FIG. 4) imposed by the tool 5 on the other hand, the charges $+Q_Z$ are added in the z direction (coordinate system related to the measuring cells) as functions of the force ½ F for the component $A_Z$ of measuring cell A and for the component $B_Z$ of measuring cell B, giving a total charge 2 $Q_Z$ as function of force F. Both actions of the invention are illustrated in FIGS. 3 and 4 and expressed in formulas.

Figure 5:
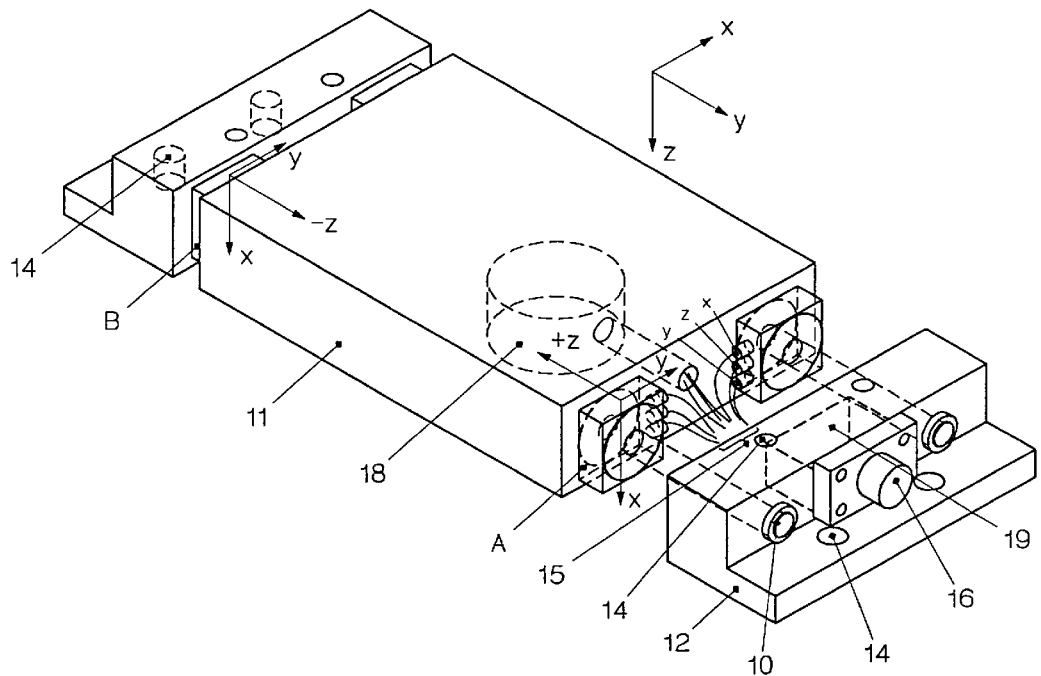
FIG. 5 shows schematically a force measuring device according to the invention as dynamometer of minimal height in perspective.
Figure 6:
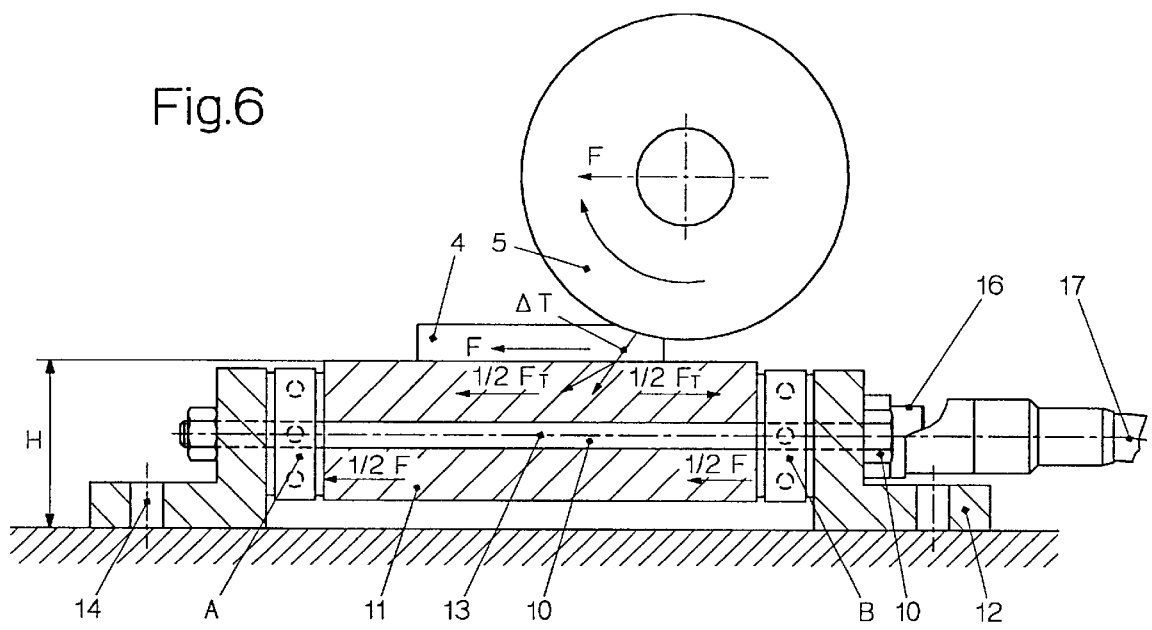
FIG. 6 shows the device according to FIG. 5 employed for machining workpieces, under temperature and force influence in section.

FIGS. 5 and 6 show in turn, three-dimensionally and in section respectively, the construction of a dynamometer for machining workpieces. This dynamometer features extremely low overall height H (FIG. 6). It has a very rigid mounting plate 11 to take the workpiece 4 machined by the revolving cutting tool 5 (FIG. 6), and it also acts as force introduction plate for the measuring cells A and B. The measuring cells are held in vertical position between the faces of plate 11 and mounting blocks 12, with the preload again applied by the preloading screw 10 which passes these through. To minimize errors due to deformation of the mounting plate 11 and preloading screws 10, the preloading screws 10 are located in the neutral axis 13 (FIG. 6) of plate 11 with regard to flexure.

The mounting blocks 12 have a number of holes 14 for the clamping screws passing through, which are not shown. They enable the measuring device itself to be mounted on a machine tool for example. The holes 14 are placed as close as possible to the measuring cells A and B, so that the rigidity of the mounted measuring device is as high as possible, giving the system a high natural frequency.

Like FIGS. 1 and 2, FIG. 5 shows the two different coordinate systems: one related to the entire measuring device shown on the left above the mounting plate 11, and one related to the measuring cells A shown at the front right and to cell B shown at the front left. Owing to the opposed orientation of the tension/pressure-sensitive sensors in measuring cells A and B, the z axes of the coordinate systems relating to the measuring cells are opposed with opposite signs.

The signal leads 15 (FIG. 5) from the individual measuring cells are led to a collective plug connector 16, whence they pass through the cable 17 to amplifiers and evaluation units not shown. However it is also possible to accommodate amplifiers and evaluation units in the mounting plate 11 and/or in one of the mounting blocks 12, for example in cavities 18 and 19, indicated by broken lines in FIG. 5. From these cavities 18 and 19, the already amplified and processed signals are then led further, enhancing the reliability of the device.

Figure 7:
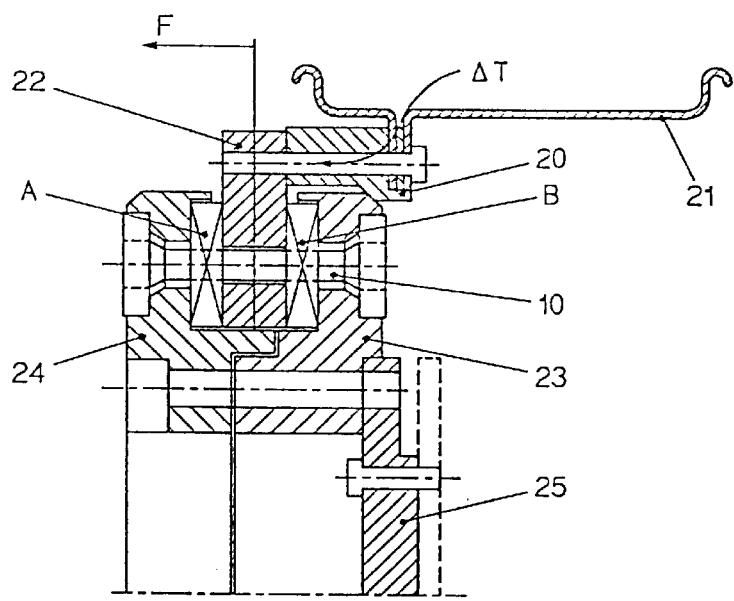
FIG. 7 shows another embodiment of the invention with rotating disk plates on the wheel hub of a vehicle in section.

The typical embodiment in FIG. 7 shows a rotating measuring device mounted on the wheel hub of a vehicle for measuring the wheel forces and moments. Through an intermediate ring 20 a rim 21 of a vehicle wheel is joined to a disk plate 22 which constitutes a force introduction platform. In contact with the two sides of this disk plate 22 are the measuring cells A and B, which in turn are constrained by the interpenetrating preloading screw 10 between the disk plate 22 and two force derivation plates 23 and 24. As in the previous examples, the sensor disks of these are oriented so that their tension/pressure sensitivity lies in the direction of the preloading screw 10, and the measuring signals from forces caused by temperature increases due to expansion of the disk plate 22 and preloading screw 10 in the measuring cells A an d B cancel each other out, while charges on measuring cells A and B set up by unilaterally oriented forces add up to the desired measuring signal. For mounting on the wheel hub not shown, the force derivation plates 23 and 24 are joined to a likewise disk-shaped mounting 25.

We claim:

1. A force and/or moment measuring device having several multicomponent force measuring cells equipped with piezoelectric sensors in conjunction with platforms for introducing force and/or moment with amplifiers and evaluation units, the force measuring cells consisting of disks sensitive to shear and/or tension/pressure, wherein the force measuring cells being placed at both end surfaces of the platform looking in the direction of the tension/pressure sensitivity of the sensors, also sensor disks sensitive to tension/pressure being opposed to each other in pairs and interpenetrated and preloaded by a common, in the platform freely extensible preloading screw so that compensation of temperature influence is obtained, and the tension/pressure-sensitive sensors opposite each other at the ends of the platform having at least approximately equal value and opposite polarity.

2. A measuring device according to claim 1, wherein the platform includes a rigid mounting plate for workpieces to be machined, with the force measuring cells arranged at right angles to the mounting surface for the workpieces.

3. A measuring device according to claim 2, wherein the platform is designed for a dynamometer of minimal height between the measuring cells and two outer assembling blocks, the measuring device being mounted by two clamping elements located close to the sensors in the assembling blocks.

4. A measuring device according to claim 1, wherein the common preloading screw lie in a neutral axis of the platform with respect to flexure of the platform.

5. A measuring device according to claim 1, wherein the platform for force introduction has the form of a disk plate, the platform is between two force derivation plates likewise disk-shaped, and interspaced with two multicomponent force measuring cells arranged opposite each other.

6. A measuring device according to claim 1 wherein signal leads for measuring signals from the force measuring cells are gathered in a collective conduit and led out via a collective plug connector, whence they are led as cable connection to amplifiers and evaluation units.

7. A measuring device according to claim 1, including amplifiers and evaluation units in one of the following elements of the measuring device: the actual force measuring platform, a mounting block, or a force derivation plate.

8. A force measuring device comprising:

a platform having a first force axis;

a pair of force measuring cells at opposed surfaces of said platform with their pressure sensitive axis being opposed; and a common preloading screw extending freely extensibly through said platform and said force measuring cells and preloading said force measuring cells so that compensation of temperature influence is obtained.

9. A force measuring device according to claim 8, including two pairs of force measuring cells with a common preloading screw on said platform for measuring moments.

10. A force measuring device according to claim 8, wherein said pressure sensitive axis of said force measuring cells is orthogonal to said first force axis of said platform.

11. A force and/or moment measuring device having several multicomponent force measuring cells equipped with piezoelectric sensors in conjunction with platforms for introducing force and/or moment with amplifiers and evaluation units, the force measuring cells consisting of disks sensitive to shear and/or tension/pressure, wherein:

the force measuring cells being placed at both end surfaces of the platform looking in the direction of the tension/pressure sensitivity of the sensors;

the sensor disks sensitive to tension/pressure being opposed to each other in pairs and interpenetrated and preloaded by a common, in the platform freely extensible preloading screw;

the tension/pressure-sensitive sensors opposite each other at the ends of the platform having at least approximately equal value and opposite polarity; and the amplifiers and evaluation units being accommodated in one of the following elements of the measuring device: the actual force measuring platform, a mounting block, or a force derivation plate.

* * * * *

UNITED STATES PATENT AND TRADEMARK OFFICE
CERTIFICATE OF CORRECTION

PATENT NO.   : 5,821,432
DATED        : October 13, 1998
INVENTOR(S)  : A. Sidler, P. Wolfer, J. Stirnimann and D. Kohler It is certified that error appears in the above-identified patent and that said Letters Patent is hereby corrected as shown below:

Claim 1,
Line 60, after "of" insert -- sensor --;
Line 62, replace "being" with -- are --;
Lines 63 and 64, delete "looking ... sensors";
Line 64, after "also" insert -- with the -- and after "disks" insert -- being --;
Line 65, replace "being" with -- and --.

Claim 11,
Line 16, after "of" insert -- sensor --;
Lines 20 and 21, delete "looking ... sensors";
Line 22, after "disks" insert -- being -- and before "being" insert -- and --.

Signed and Sealed this

Sixteenth Day of April, 2002

Attest:

JAMES E. ROGAN
*Director of the United States Patent and Trademark Office*

*Attesting Officer*